United States Patent
Garmire et al.

(10) Patent No.: US 7,187,688 B2
(45) Date of Patent: Mar. 6, 2007

(54) PRIORITY ARBITRATION MECHANISM

(75) Inventors: Derrick L. Garmire, Kingston, NY (US); Jay R. Herring, Poughkeepsie, NY (US); Craig B. Stunkel, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 10/185,028

(22) Filed: Jun. 28, 2002

(65) Prior Publication Data

US 2004/0001502 A1  Jan. 1, 2004

(51) Int. Cl.
  *H04L 12/26* (2006.01)
(52) U.S. Cl. .................................. 370/428; 370/462
(58) Field of Classification Search ................ 370/419, 370/428, 462
  See application file for complete search history.

(56) References Cited

U.S. PATENT DOCUMENTS

| | | | |
|---|---|---|---|
| 5,006,978 A | 4/1991 | Neches | 364/200 |
| 5,311,513 A | 5/1994 | Ahmadi et al. | 370/85.4 |
| 5,519,709 A | 5/1996 | Albrecht et al. | 370/94.3 |
| 5,539,729 A | 7/1996 | Bodnar | 370/18 |
| 5,555,264 A | 9/1996 | Sallberg et al. | 370/17 |
| 5,802,051 A | 9/1998 | Petersen et al. | 370/395 |
| 5,974,465 A | 10/1999 | Wong | 709/234 |
| 5,991,302 A | 11/1999 | Berl et al. | 370/400 |

FOREIGN PATENT DOCUMENTS

WO  WO00/20876 A1 * 4/2000

* cited by examiner

*Primary Examiner*—Melvin Marcelo
(74) *Attorney, Agent, or Firm*—Lawrence D. Cutter

(57) ABSTRACT

A method is provided for selecting a data source for transmission on one of several logical (virtual) lanes embodied in a single physical connection. Lanes are assigned to either a high priority class or to a low priority class. One of six conditions is employed to determine when re-arbitration of lane priorities is desired. When this occurs a next source for transmission is selected based on a the specification of the maximum number of high priority packets that can be sent after a lower priority transmission has been interrupted. Alternatively, a next source for transmission is selected based on a the specification of the maximum number of high priority packets that can be sent while a lower priority packet is waiting. If initialized correctly, the arbiter keeps all of the packets of a high priority packet contiguous, while allowing lower priority packets to be interrupted by the higher priority packets, but not to the point of starvation of the lower priority packets.

5 Claims, 2 Drawing Sheets

PRIORITY ARBITRATION MECHANISM

This invention was made with Government support under subcontract B338307 under prime contract W-7405-ENG-48 awarded by the Department of Energy. The Government has certain rights in this invention.

BACKGROUND OF THE INVENTION

The present invention is generally directed to a method and system for selecting information sources for transmission over a single physical connection. More particularly the present invention is directed to a method for arbitrating amongst a plurality of competing information sources in a manner which promotes the transmission of high priority subunits of information without starving the channel's transmission of low priority subunits. Even more particularly, the present invention is directed to systems and methods for transmitting information in packet form while providing a mechanism for source selection and/or arbitration based on subpacket units of information. In particular, the arbiter of the present invention manages a plurality of source priorities during the transmission duration of a single packet.

In those situations in which a single physical connection, be it optical or electrical, exists between a number of information sources, there is a clear need to determine which one of the information sources is to be provided with current utilization of the physical connection. In situations in which all of the information sources have the same importance or priority for transmission, there are a number of possible methods that may be employed for arbitrating the use of the single channel. For example, with all information sources having the same priority, a round-robin approach may be used with each source getting its turn in a predefined sequence. In another scheme useful in such cases, the information source may be selected at random. In yet another channel utilization method, the "arbiter" for source selection may be structured to pick the source that has been waiting the longest (Least Recently Used—LRU).

However, in situations where there is a priority associated with a plurality of information sources all of which are competing for utilization of the same single physical connection, certain problems can arise that are not present even when the information sources are divided most simply into just two priority classifications: high priority and low priority. For example, if high priority sources are always given priority, lower priority sources may experience undue delay and/or may in fact be completely closed out of the transmission process. This is a particularly annoying problem when information is transmitted in packets and it is further divided into packet subunits, also often referred to herein as "flits" since in these situations one is also concerned with the fact that some sources may have already initiated transmission. On the other hand, one does not want to preclude at least some transmission for the lower priority sources. In these circumstances, however, there is a very real problem in determining how to prevent higher priority sources from excessively dominating the usage of the connection while still allowing lower priority usage which should still be at least somewhat constrained so as to preserve, as much as possible, a contiguous flow for the higher priority information packets.

SUMMARY OF THE INVENTION

In accordance with a preferred embodiment of the present invention, A method is provided for selecting one of a plurality of data sources for transmission over a single physical connection. First, it is determined that conditions exist for a possible change in information source. It is then determined whether or not a certain number (first maximum) of subunits of information, $M_t$, for the currently selected source has been exceeded. It is then determined whether or not a certain number (second maximum) of high priority subunits of information, $M_r$, for the currently selected source has been exceeded. $M_r$ is employed when it is determined that the transmission of at least one low priority subunit of information has been interrupted. If neither of these numbers has been exceeded a high priority data source is selected as the next source for transmission. If either one of said these numbers has been exceeded, a low priority data source is selected as the next source for transmission.

The determination that conditions exist for a possible change in source selection is preferably based upon one or more of the following conditions. For example, it may be determined that the maximum number of allowable subunits of information, $M_t$, for the currently selected source have been transmitted. A possible change in source may also be conditioned upon a determination that the currently selected source is no longer eligible to transmit due to receiving a "back-pressure" indication from the destination indicating that the flits can no longer be reliably received. In this case, more vernacularly it is often said that the source has "run out of credit." Another trigger for a possible change in source may also arise from a determination that the currently selected source no longer has data available for transmission. In another instance, a possible change in source is predicated upon determining that the currently selected source has finished transmitting the number of subunits of information in a complete unit of information (a complete packet, for example). In yet other circumstances, a possible change in information source selection is based upon a determination that no source has subunits of information available for transmission. Lastly, but not limited hereto, a reassessment of source selection for the next user of the single physical connection, is based upon the determination that the currently selected source is one that had been given supervening priority and is now finished.

Accordingly, it is an object of the present invention to provide a mechanism for selecting one of a plurality of information sources for transmission over a single physical connection.

It is yet another object of the present invention to provide an arbiter for selecting from amongst a plurality of information sources so as to satisfactorily solve the competing goals of ensuring transmission of high priority subunits of information while still not completely cutting off the flow of lower priority information from a different source.

It is still another object of the present invention to improve the transmission of information packets.

It is a still further object of the present invention to improve communications and the transmission of messages in a multinode data processing system in which messages are sent in packets via a switch, including switches such as cross-bar switches.

It is an object of the present invention to optimize the utilization of a single physical connection in the face of competing high and low priority access needs.

Lastly, but not limited hereto, it is an object of the present invention to ensure the full utilization of a single information channel, especially when information sources having a plurality of priority assignments are to be transmitted.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
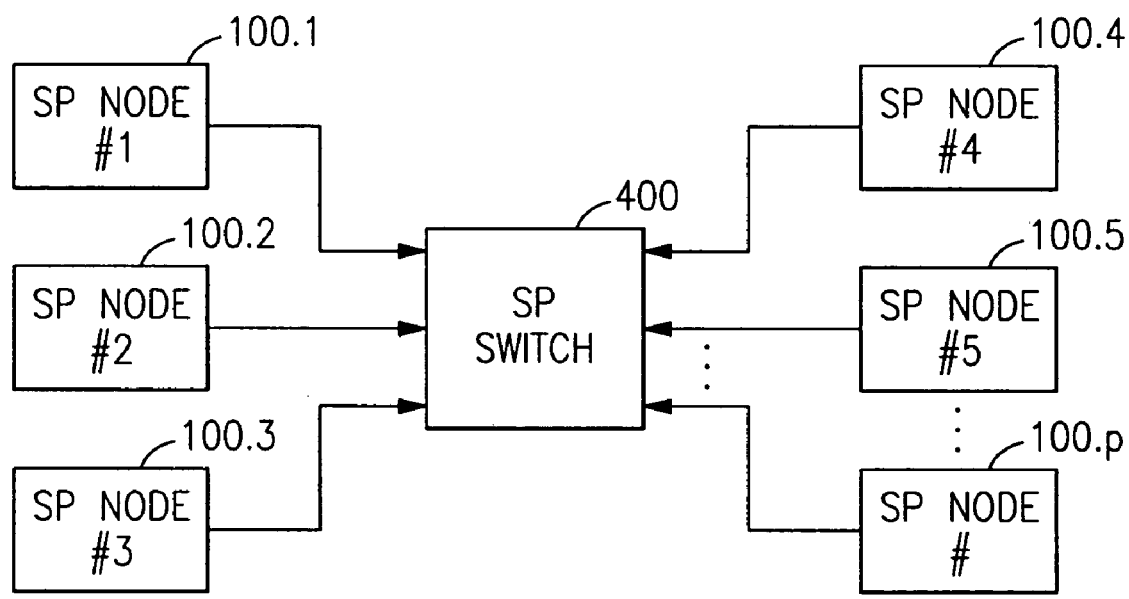
FIG. 1 is a schematic diagram illustrating a multinode data processing system of the kind which is particularly suited for employment of the present invention.

The environment in which the present invention is preferably employed is illustrated in FIG. 1 in which there are shown a plurality of data processing nodes, 100.1 through 100.$p$ each of which may include one or more microprocessor units. These nodes are best exemplified herein as being nodes from applicants' assignee's pSeries line of computers (formerly referred to as the RS/6000 line of machines). These machines are capable of being connected together in a scalable, parallel multinode data processing system in which messages are readily exchanged between nodes via switch 400. The "SP" designation in FIG. 1 does in fact refer to the scalable, parallel nature of this system.

Figure 2:
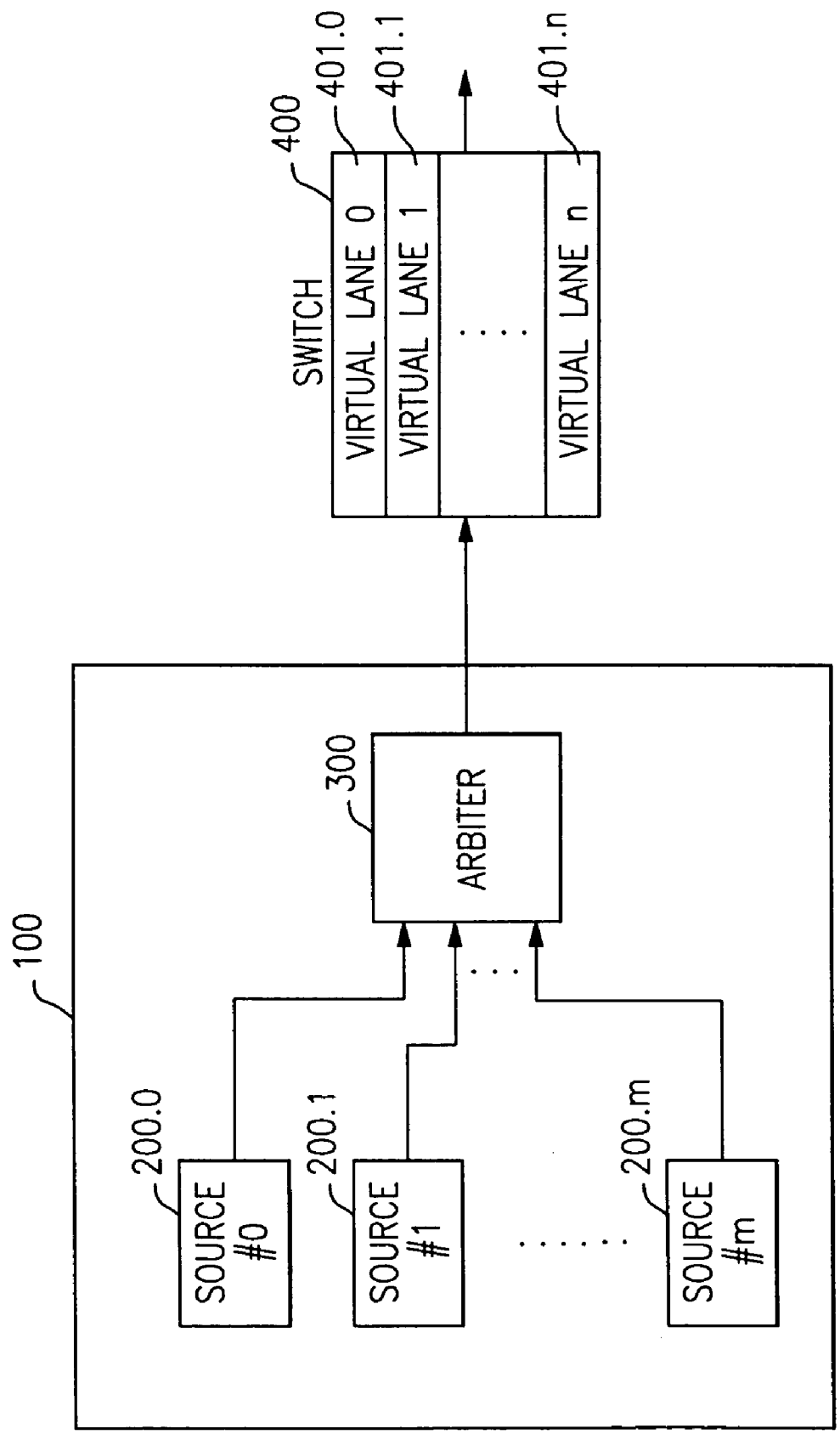
FIG. 2 is a schematic diagram illustrating the placement and role of the arbiter of the present invention as a determiner of the next information source as a user of one of a plurality of virtual lanes for a single physical connection.

The present invention and its relation to a single physical connection, as embodied as switch 400, are illustrated more particularly in FIG. 2. In particular, with typical node 100 there are present a plurality of information sources 200.0 through 200.$m$ having at least two levels of priority, say, high and low. These information sources compete for access to switch 400 which is effectively partitioned by the operation of arbiter 300 into a plurality of Virtual Lanes 401.0 through 401.$n$ (also referred to herein as $VL_0$ through $VL_n$).

Unlike most arbiters which only have to deal with one priority for the duration of the packet, the arbiter of the present invention does interrupt packets of lower priority to service packets of higher priority. First, let's define the priorities as Virtual Lanes (VL's), of which we will assume, solely for the purposes of providing an example herein, that there are 8 Virtual Lanes. As used herein, the term "flits" refers to subunits of information that make up information packets, as the term "packet" is generally understood; alternatively, the term "flit" refers to a "flow control unit", or the amount of data that can be transmitted for each flow control "token" that is available. In the practice of the present invention, all flits of a given packet are not necessarily transmitted contiguously; they may, in fact, be interrupted by flits from other packets (on other Virtual Lanes).

In the practice of the present invention, there are two preferred options for controlling prioritized transmission on the Virtual Lanes. One of these two options is selected at the time of system initialization. The first acceptable option and the preferred default mode is the Least Recently Used (LRU) mechanism for determining priority. The second option implements a monotonically decreasing priority from virtual lane 0 to virtual lane 7 (that is, $VL_0$ has highest priority, $VL_7$ has lowest priority).

The overall intent of the Virtual Lane arbitration is based on the assumption that high priority Virtual Lanes contain relatively small packets (for example, Non-uniform Memory Access (NUMA) requests and response type packets), and that the lower priority Virtual Lanes contain larger packets (Message Passing type packets). If initialized correctly, the Virtual Lanes arbiter keeps all of the flits of a high priority packet contiguous, while allowing the lower priority packets to be interrupted by the higher priority packets, but not to the point of starvation of the lower priority packets. This is a very important aspect associated with the operation of the present invention.

For either one of these priority schemes, the arbiter is initialized with four other parameter values that are used to control the arbitration (selection) process. These four parameters are described below.

Max_Cut_Through_Priority (=$M_c$) tells the arbiter that flits on Virtual Lanes higher in priority than this number can be transmitted when another packet has been interrupted due to reaching one of the transmission limiting conditions defined below. It is essentially the breakpoint in the Virtual Lanes between the Virtual Lanes with small packets (high priority) and the Virtual Lanes with long packets (low priority). Virtual Lane numbers lower than the value in this register are considered to be high priority and Virtual Lanes equal to or greater are considered to be low priority. In the LRU arbitration scheme, this results in two Least Recently Used (LRU) arbiters (also referred to as "lures"): one LRU arbiter for high priority packets and one LRU arbiter for low priority packets.

Max_Length_to_Transmit (=$M_t$) tells the arbiter the maximum number of flits in a single packet to transmit before interrupting that packet, thus limiting the total number of flits an individual Virtual Lane is allowed to transmit before the other Virtual Lanes get a chance at transmission. This register is set up at system initialization time, and is expected to be large enough that the packets (not flits) being transmitted on the higher priority virtual lanes (the packets with Virtual Lanes less than the Max_Cut_Through_Priority=$M_c$) are smaller than the $Max_{13}$ Length_to_Transit number, $M_t$, such that these packets are not broken up due to the Max_Length_to_Transmit. If this register is set to 0, the packets are not be interrupted due to length.

Each time a flit is received for a given Virtual Lane, a Max_Length_Counter representing $M_r$, is incremented. If the value of this counter equals the Max_Length_to_Transmit value, then a Max_Length_Trigger signal is generated to initiate an arbitration for a new Virtual Lane for the next request for flits. If re-arbitration occurs at any time due to another condition, then the Max_Length_Counter is reset to 0. If the Max_Length_to_Transmit value is set to 0, then the Max_Length_Trigger signal cannot be set, thus disabling this function. The parameters such as $M_t$ and $M_r$ are programmable to provide optimization for different traffic patterns and/or different applications, so that a system running two separate applications (at different times) operates so that its arbitration protocol is optimized differently for best performance.

It is important to note that the arbiter will never start a new packet with a priority lower than the Max_Cut_Through_Priority if another packet is stopped due to the Max_Length_to_Transmit.

Max_Number_before_Return (=$M_r$) tells the arbiter the maximum number of high priority flits (flits with Virtual Lanes lower than the Max_Cut_Through_Priority) that can be transmitted after a lower priority packet has been interrupted. Unlike the Max_Length_Trigger parameter which causes a re-arbitration, in this case the current high priority packet is not interrupted, but rather transmission continues until the next scheduled re-arbitration Each time a flit is received on a Virtual Lane higher in priority than the Max_Cut_Through value, $M_c$, and there is a Virtual Lane lower than or equal to the Max_Cut_Through value that has been interrupted due to reaching the Max_Length_to_Transmit value, then the Max_Return_Counter is incremented. If the value of this counter equals the Max_Number_before_returnn value, $M_r$, then a Max_Return_Trigger signal is set. Once the Max_Return_Trigger signal is set, then all of the high priority Virtual Lanes are gated off from the next arbitration, guaranteeing a return to the lower priority Virtual Lanes. If the Max_Number_before_Return value is set to 0, then the Max_Return_Trigger signal cannot be set, thus disabling this function.

Max_Number_before Start (=$M_s$) tells the arbiter the maximum number of high priority flits that are to be transmitted while a low priority packet is waiting. Unlike Max_Length_Trigger which causes a re-arbitration, in this case the current high priority packet is not interrupted but rather transmission continues until the next scheduled re-arbitration.

Each time a flit is received on a Virtual Lane higher in priority than the Max_Cut_Through value, $M_c$, and there is a Virtual Lane lower than or equal to the Max_Cut_Through value waiting to be transmitted, then a Max_Start_Counter is incremented. If the value of this counter equals the Max_Number_before_Start value, then a Max_Start_Trigger signal is set. Once the Max_Start_Trigger signal is set, then all of the high priority Virtual Lanes are gated off from the next arbitration, guaranteeing a start on one of the lower priority Virtual Lanes. If the Max_Number_before_Start value is set to 0, then the Max_Start_Trigger signal cannot be set, thus disabling this function There are six conditions that are employed in the present invention to cause the arbiter to re-arbitrate:

(1.) The current priority source has reached the Max_Length_to_Transmit flit count;
(2.) The current priority source has run out of credits, and can no longer transmit flits
(3.) The current priority source is starved for flits to transmit;
(4.) The current priority source has reached the end of a packet;
(5.) Previously no source with priority has flits, and now or more sources do (This describes the situation of going from a state where there is nothing to transmit (an idle state), to a state having one or more streams of packet data ready for transmission.); and
(6.) The current priority source was interrupted by non-priority based packets which supersede all Virtual Lane priorities (e.g., Service packets, Time-of-Day, etc.) and are now able to return to the current priority.

Although there are only eight Virtual Lanes in the example described above, there are sixteen distinct priorities set up in the Virtual Lane arbitration logic. The is done to help to maintain fairness to those Virtual Lanes that were bumped from the current arbitration due to running out of credits, or being starved. Since these Virtual Lanes were bumped due to conditions out of their control (normal re-arbitration rules), they are now given a higher priority on the next arbitration cycle in which they can participate (have credits, or are no longer starved).

To do this, two sets of priorities are set up, one for normal Virtual Lane flit transmission, and one for those higher priority Virtual Lanes that have been "unfairly" bumped. In these circumstances, any Virtual Lane in the higher priority bucket is not gated off from the next arbitration cycle (assuming it has credits or is no longer starved).

LRU EXAMPLE

The following initial system register settings are assumed herein, solely for the sake of example:
$M_t$=Max_Length_to_Transmit=16 flits
$M_c$=Max_Cut_Through_Priority=4
$M_r$=Max_Number_before_Return=5
$M_s$=Max_Number_before_Start=15

It is also assumed, again solely for the sake of example that the following represents the status for packet availability on the various Virtual Lanes:
$VL_0$=20 (each packet is one flit in length)
$VL_1$=2 (each packet is one flit in length)
$VL_2$=0 (each packet is one flit in length)
$VL_3$=1 (each packet is one flit in length)
$VL_4$=2 (each packet is multiple flits in length)
$VL_5$–$VL_7$=0

Assume the LRU algorithm is setup such that $VL_0$ is older than $VL_1$ which is older than $VL_2$, which is older than $VL_3$. Also, assume that we are currently transmitting a 25 flit packet on $VL_5$. When 16 flits of this packet have been transmitted, it will be interrupted (because of the value above assigned to $M_t$) and packets are sent from the following Virtual Lanes: $VL_0$, $VL_1$, $VL_3$, $VL_0$, $VL_1$. After these five packets, the interrupted packet on $VL_5$ continues (because of the value above assigned to $M_r$) and completes. After this packet completes, 15 packets from $VL_0$ are transmitted ($VL_1$, $VL_2$, and $VL_3$ have no packets available). At this point $VL_0$ has 3 packets and $VL_4$ has 2. Next a packet from $VL_4$ is started (because of the value above assigned to $M_s$). If the packet is larger than 16 flits, it is interrupted after the first 16 flits (like the original packet in $VL_5$).

MONOTONIC EXAMPLE

Assuming the same settings, packets, and starting points as in the LRU example above, when the 16 flits of the packet in $VL_5$ are complete, five packets from $VL_0$ are transmitted (because of of the value above assigned to $M_t$). Then the packet in $VL_5$ are completed (because of of the value above assigned to $M_r$). Next 15 packets in $VL_0$ are transmitted. After that the first packet in $VL_4$ is started (because of of the value above assigned to $M_s$). If the system requires a strict priority between packets, the $M_s$=Max_Number_before_Start register is set to 0.

While the invention herein is described above in terms of a single split between high priority and low priority subunits (or flits), it is also anticipated that more granular priority specifications may also be employed. For example, in a four-way priority split, the first split is used to specify priority of each of a group of two sources. The second split specifies the priority within each of the groups specified by the first split.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for selecting one of a plurality of data sources for transmission via a single physical connection, said method comprising the steps of:

determining that conditions exist for a possible change in source;

determining that a first maximum number of subunits of information for a currently selected source has not been exceeded;

determining that a second maximum number of high priority subunits of information for said currently selected source has not been exceeded, said second maximum number being applicable upon condition that interruption of transmission of at least one low priority subunit of information has been interrupted;

upon the condition that neither of said maximum numbers have been exceeded, selecting a high priority data source as the next source for transmission; and upon the condition that either one of said maximum numbers have been exceeded, selecting a low priority data next source for transmission.

2. The method of claim 1 in which determining that conditions exist for a possible change in source includes a step selected from the group of steps consisting of:

determining that a maximum number of allowable subunits of information for said currently selected source have been transmitted;

determining that said currently selected source is no longer eligible to transmit;

determining that said currently selected source no longer has data available for transmission;

determining that said currently selected source has finished transmitting the number of subunits of information in a complete unit of information;

determining that no source has subunits of information available for transmission; and determining that said currently selected source is one that had been given supervening priority and is now finished.

3. The method of claim 1 in which said selecting of a high priority data source as the next source for transmission includes a step selected from the group of steps consisting of:

selecting said high priority source as being the one that was least recently transmitted; and selecting said high priority source in a round robin fashion from amongst a set of high priority sources.

4. The method of claim 1 in which said selecting of a low priority data source as the next source for transmission includes a step selected from the group of steps consisting of:

selecting said low priority source as being the one that was least recently transmitted; and selecting said low priority source in a round robin fashion from amongst a set of low priority sources.

5. A method for selecting a data source for transmission on one of several logical lanes embodied in a single physical connection, said method comprising the steps of:

assigning logical lanes to either a high priority class or to a low priority class;

determining that conditions exist for a possible change in source;

determining that a first maximum number of high priority subunits of information for a currently selected source has not been exceeded or that a second maximum number of high priority subunits of information for said currently selected source has not been exceeded, said second maximum number being applicable upon condition that interruption of transmission of at least one low priority subunit of information has been interrupted; and selecting a high priority data source as the next source for transmission on one of said high priority lanes.

* * * * *